UNITED STATES PATENT OFFICE.

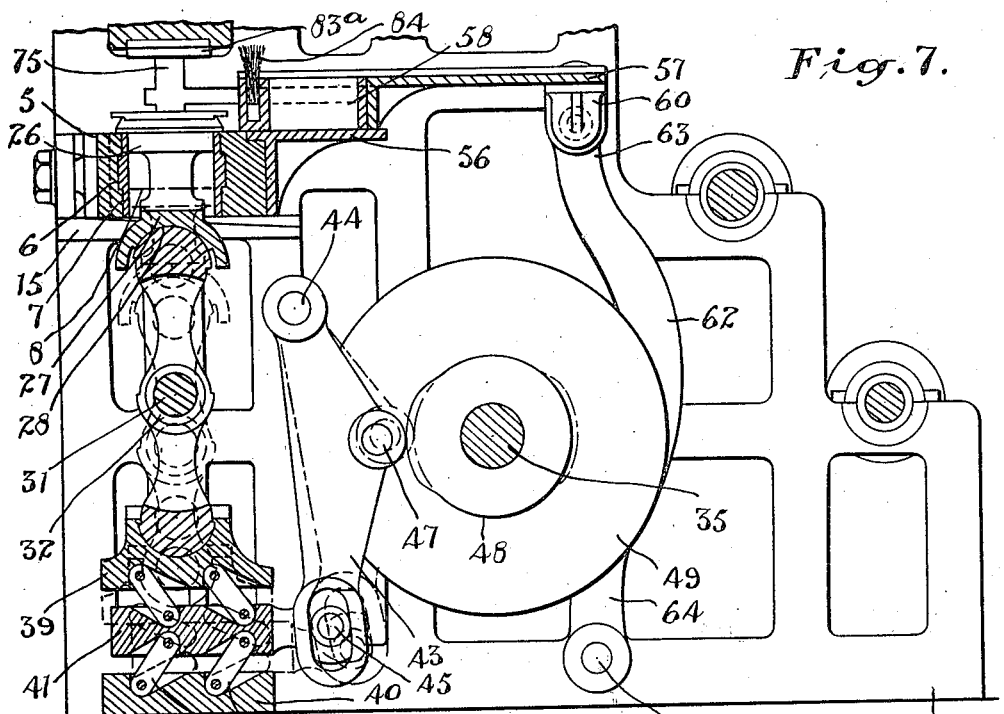
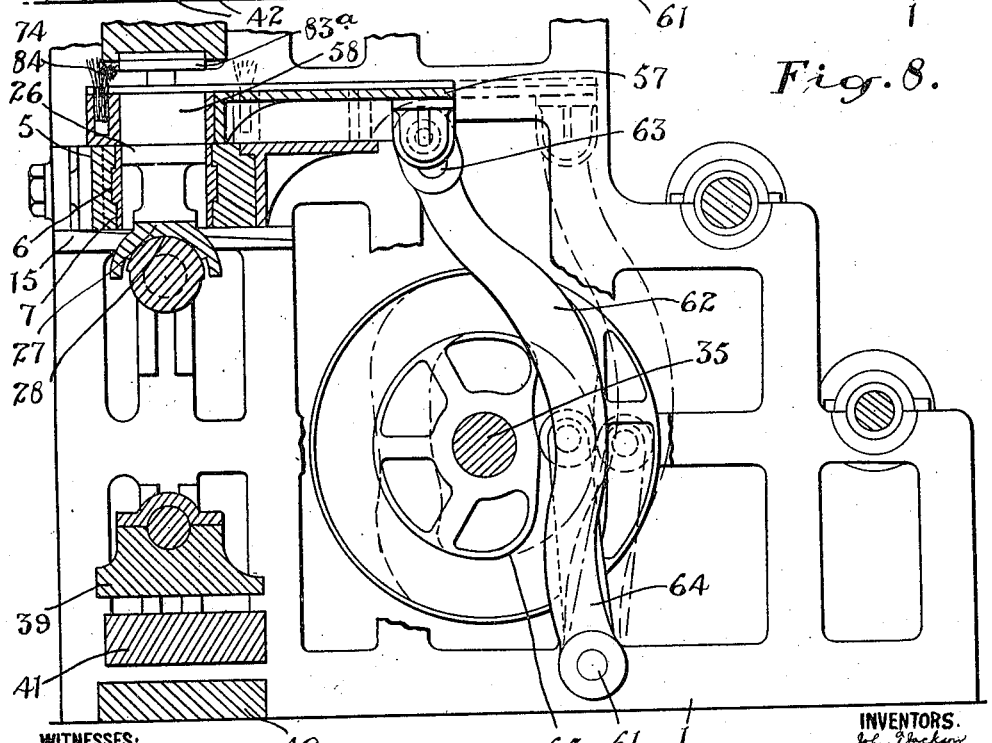

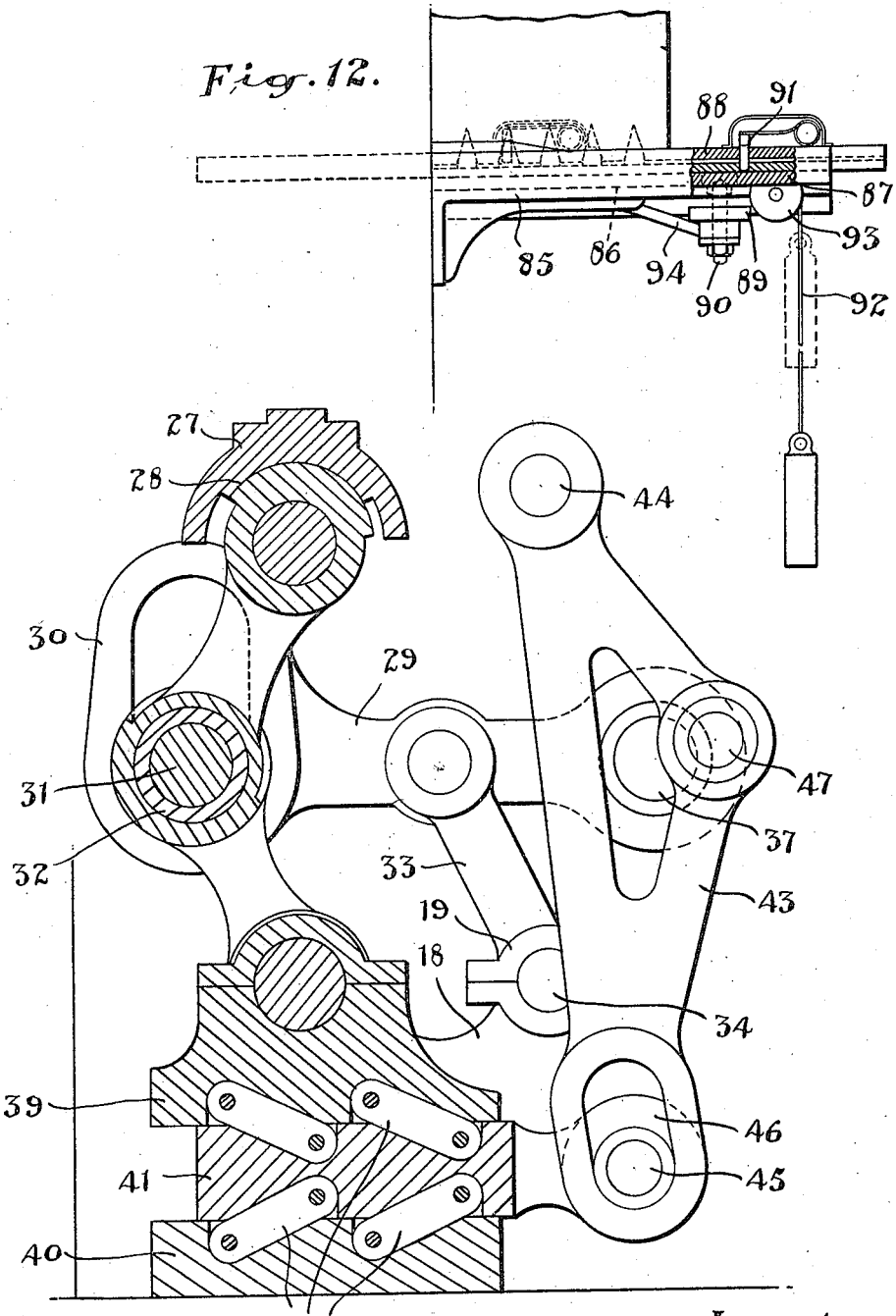

JOHN T. JACKSON AND SAMUEL JACKSON, OF TORONTO, ONTARIO, CANADA.

BRICK AND STONE PRESS.

1,320,471.        Specification of Letters Patent.        Patented Nov. 4, 1919.

Application filed December 13, 1916. Serial No. 136,657.

*To all whom it may concern:*

Be it known that we, JOHN THOMAS JACKSON and SAMUEL JACKSON, both subjects of the King of Great Britain, and residents of the city of Toronto, county of York, Province of Ontario, in the Dominion of Canada, have invented certain new and useful Improvements in Brick and Stone Presses, as described in the following specification and illustrated in the accompanying drawings, that form part of the same.

The principal objects of the invention are, to reduce the cost of production of pressed brick or artificial stone, to produce an article of great strength and density, and to produce a brick having a hard absorbent body and a glazed facing impervious to moisture.

A further object of the invention is to devise a machine of exceptional power, of simple construction and which may be operated at very low cost.

A still further object is to effect the stamping of any desirable impression such as a frog or a name or special mark in the brick at one and the same operation with the forming of the brick.

The principal feature of the invention consists in the novel construction and arrangement of parts, whereby the body and facing materials are fed to the mold and the whole pressed simultaneously and finally discharged.

In the drawings, Figure 1 is a side elevational view of a press constructed in accordance with this invention.

Fig. 7 is a vertical sectional view of the lower portion of the machine on the line $e$—$f$ of Fig. 4, showing the lifting cam and co-acting parts in two opposed positions.

Fig. 8 is a vertical sectional view of the lower portion of the machine on the line $x$—$y$ of Fig. 4, showing the center feed table operating mechanism in two opposed directions.

Fig. 12 is a side elevational view of the mechanism for feeding the surfacing material being shown partly in vertical section.

Fig. 13 is a vertical sectional detail of the means for lifting the main toggle and dies for discharging the bricks from the molds.

Like numerals of reference indicate corresponding parts in each figure.

Figure 1:
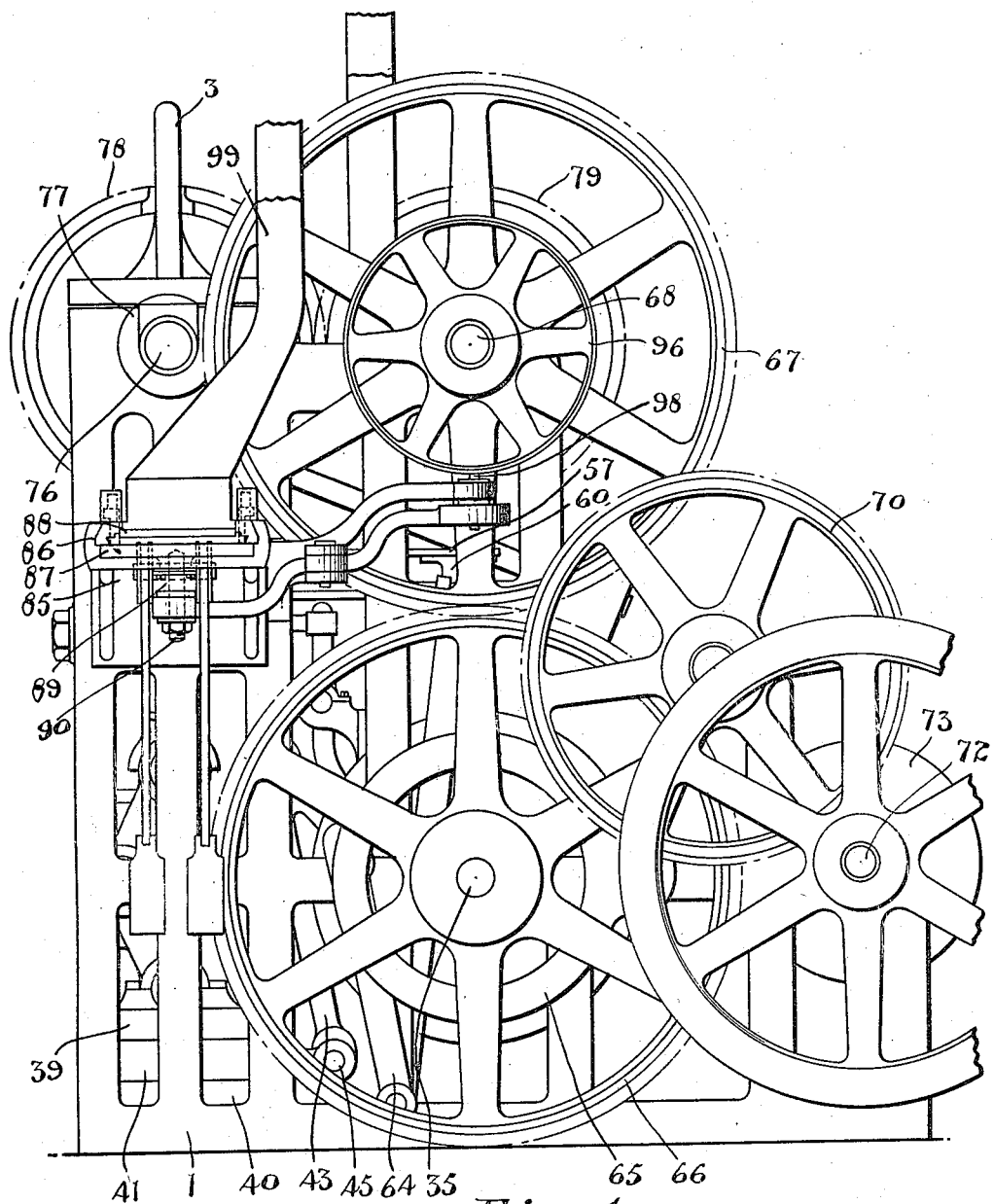
Figure 2:
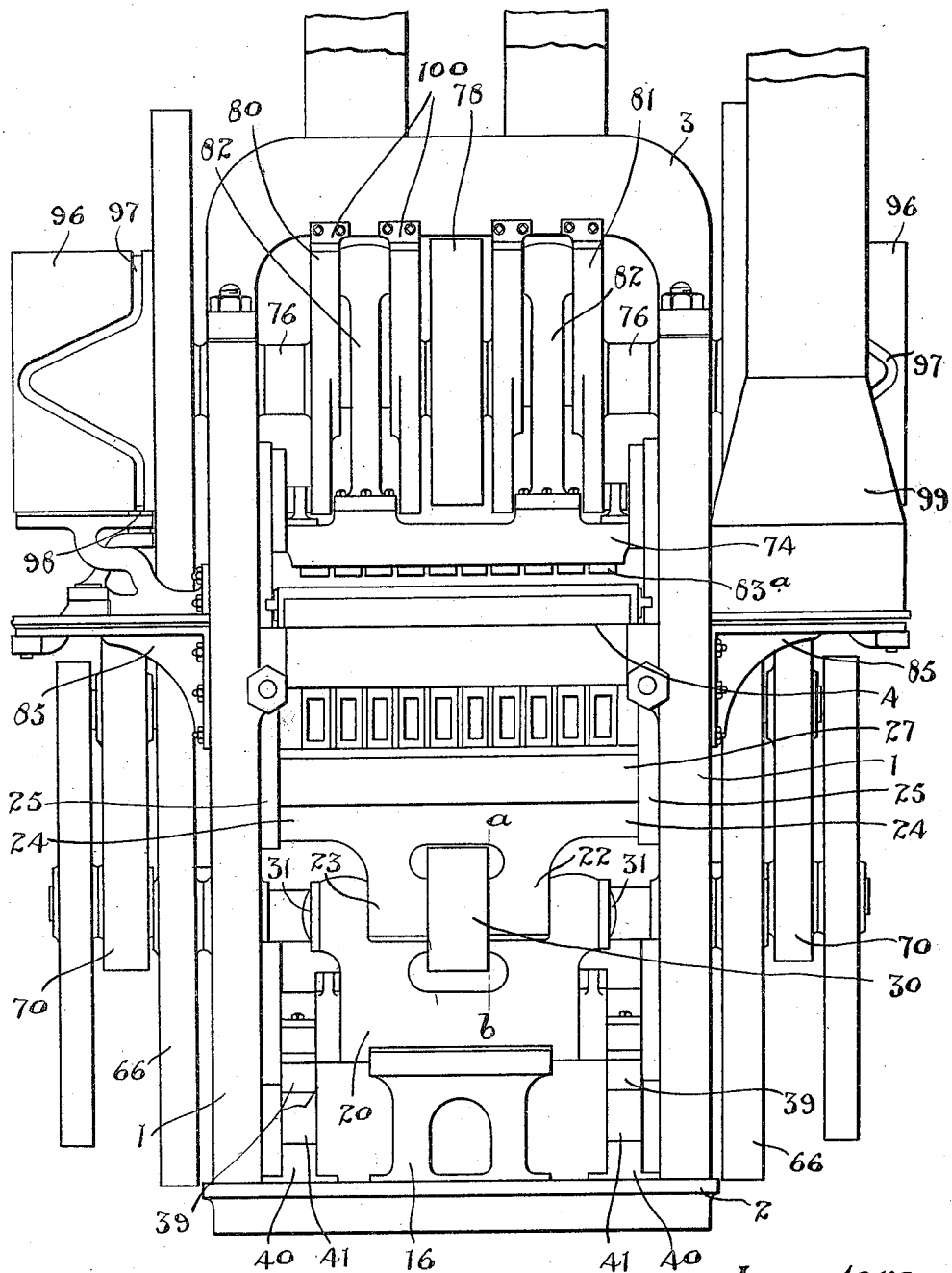
Fig. 2 is a front elevational view of the machine.
Figure 3:
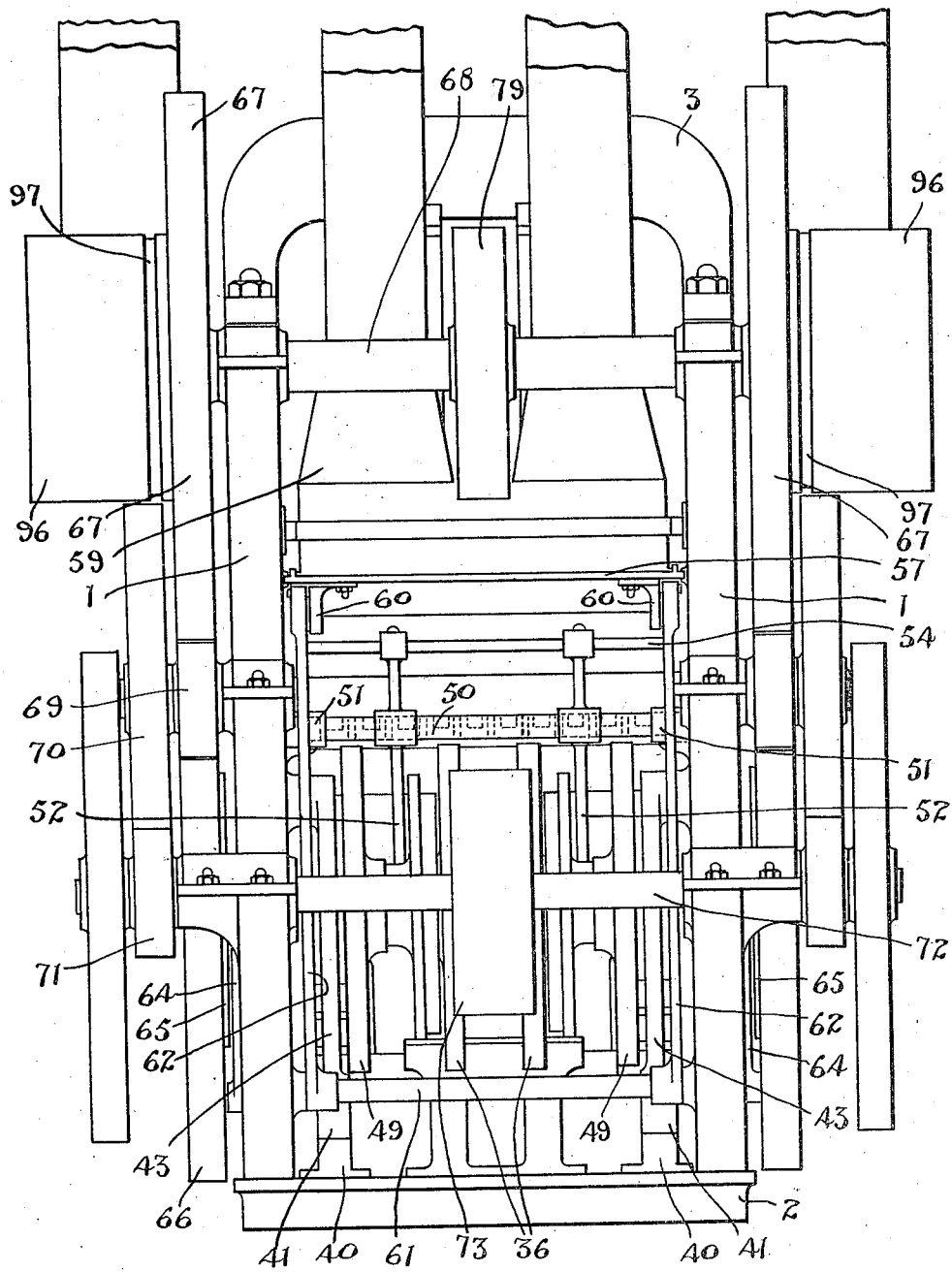
Fig. 3 is a rear elevational view.
Figure 4:
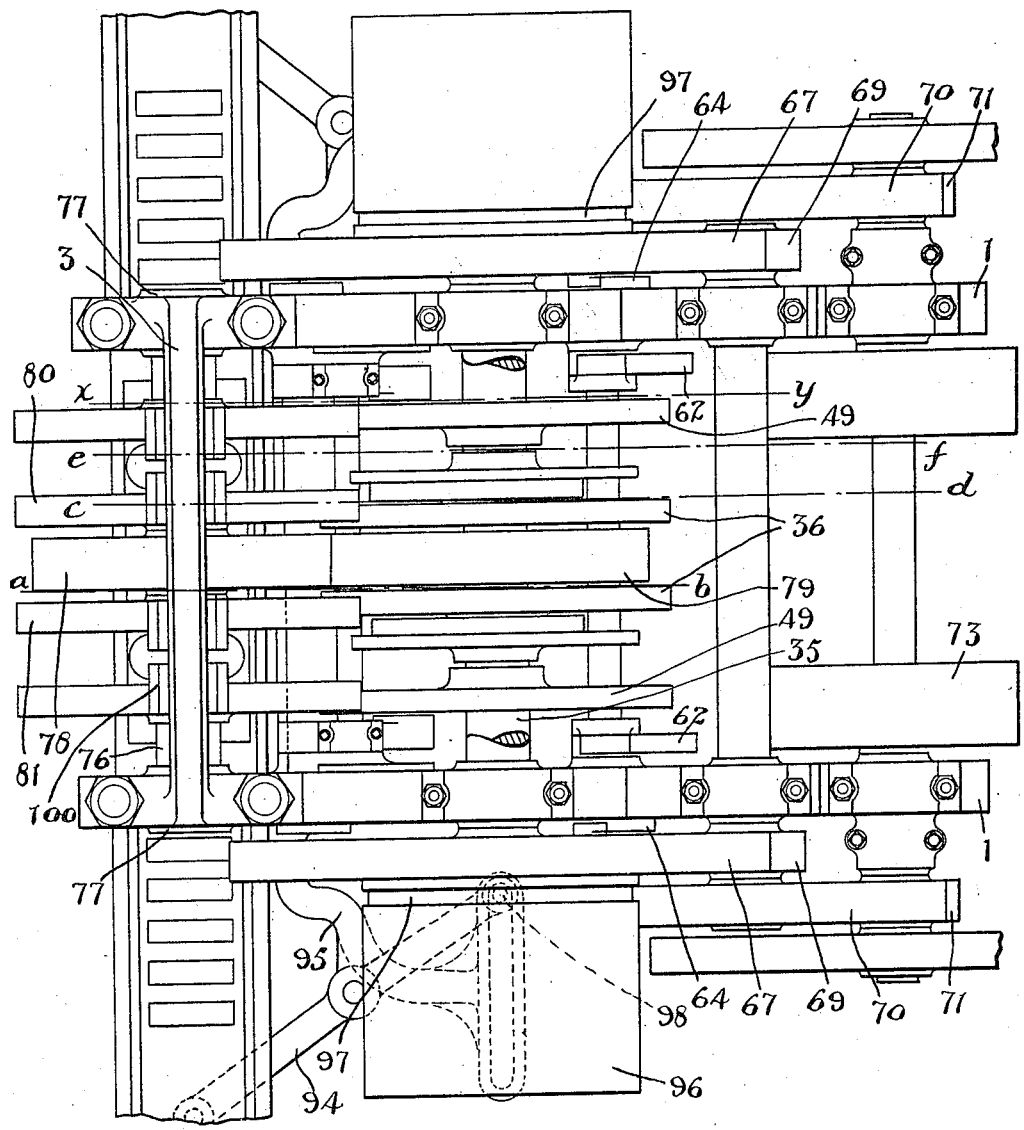
Fig. 4 is a plan view with the center feed table removed and one of the shafts broken away.
Figure 5:
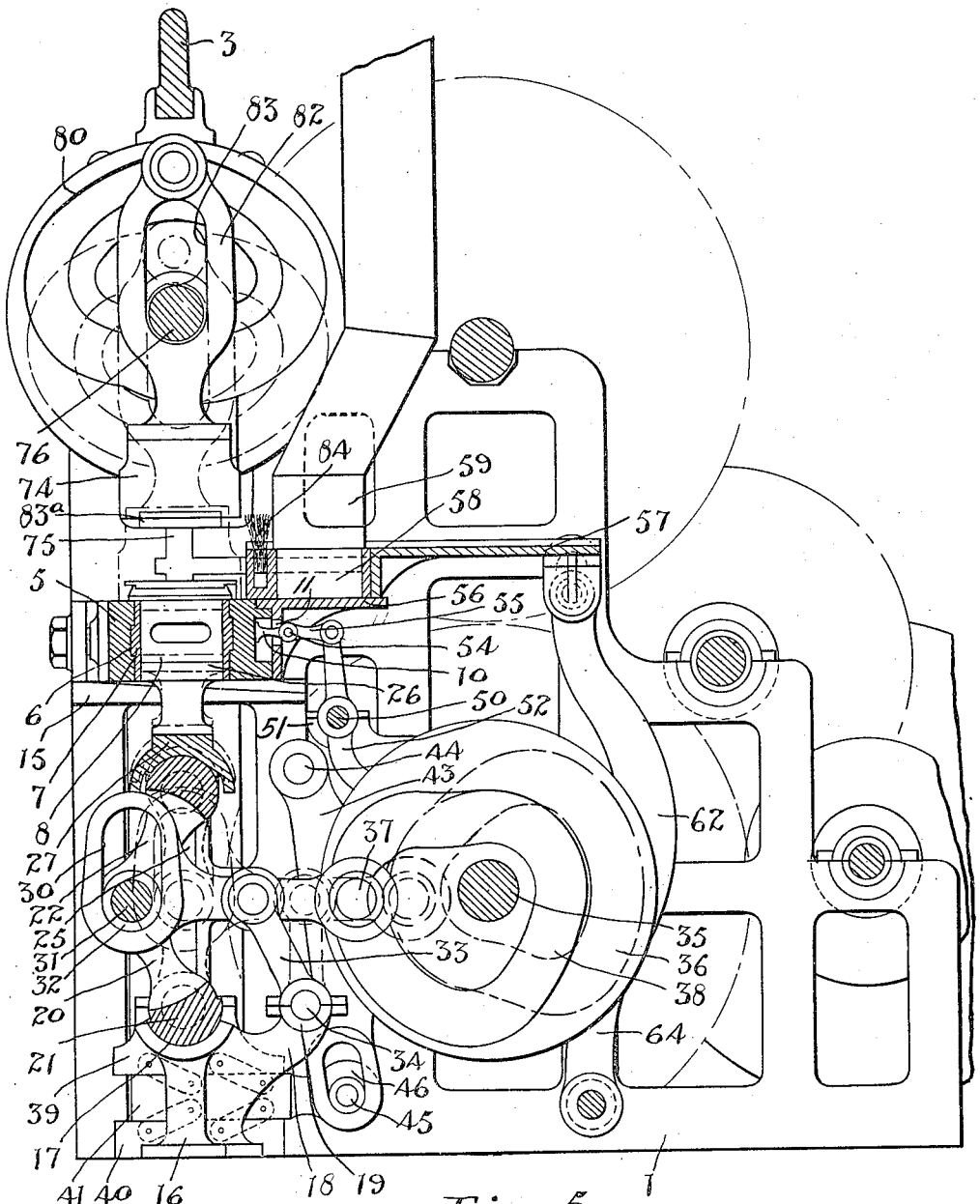
Fig. 5 is a vertical sectional elevational view on the line $a$—$b$ of Fig. 4 showing the main presser cams and the presser mechanism, the position of the parts when in the position of applying the maximum pressure being shown in dotted lines.
Figure 6:
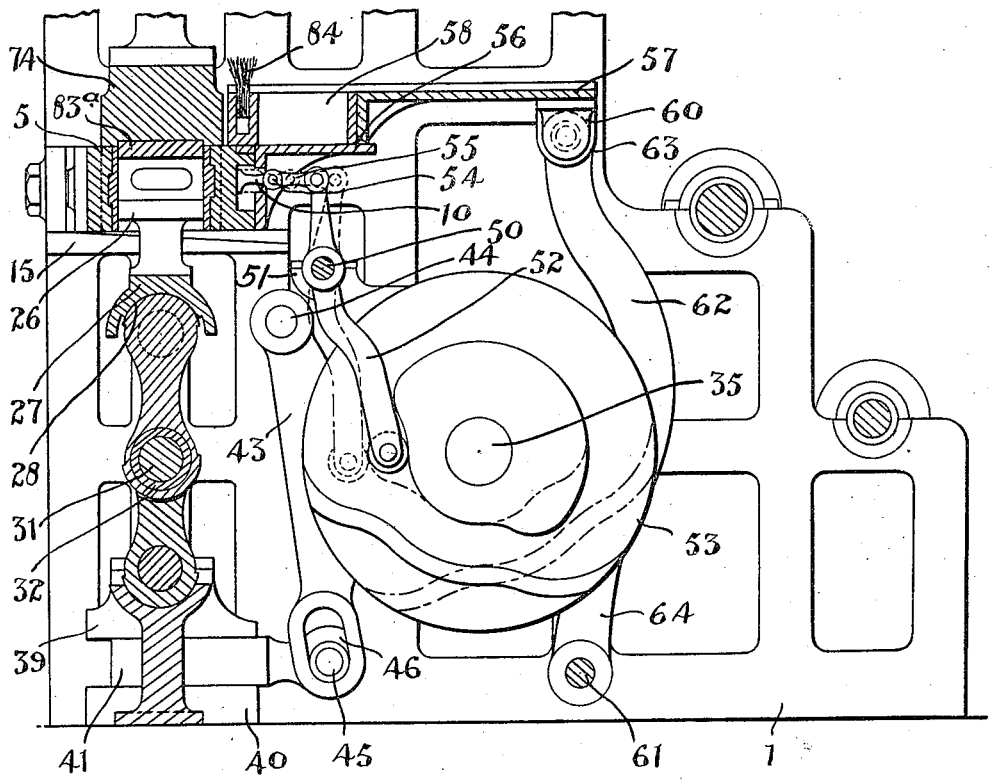
Fig. 6 is a vertical sectional view of the lower portion of the machine on the line $c$—$d$ of Fig. 4, showing the frog presser operating cam and co-acting parts in one position full lines and the directly opposed position in dotted lines.
Figure 9:
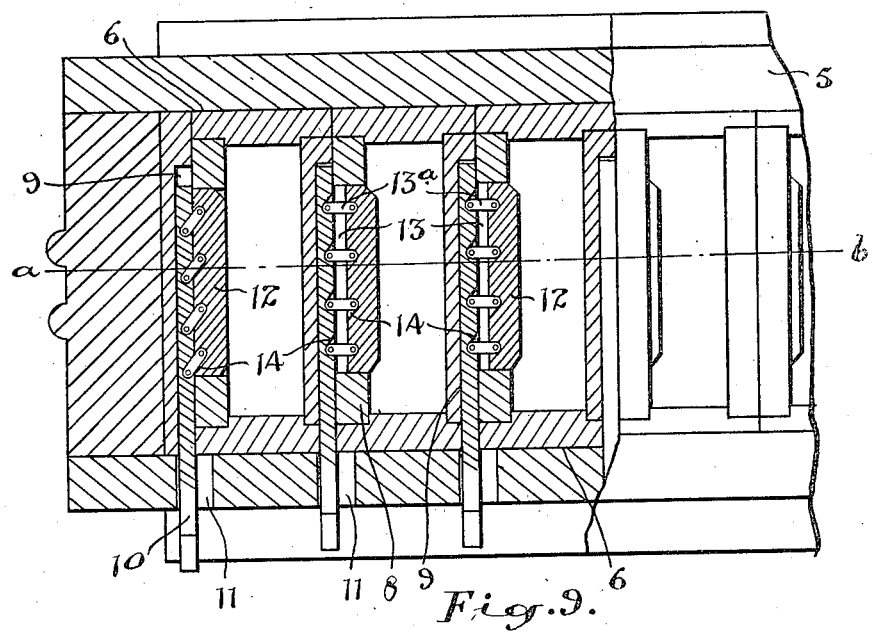
Fig. 9 is a plan view of a portion of the die table or molds partly in horizontal section, showing the frog forming mechanism in two positions.
Figure 10:
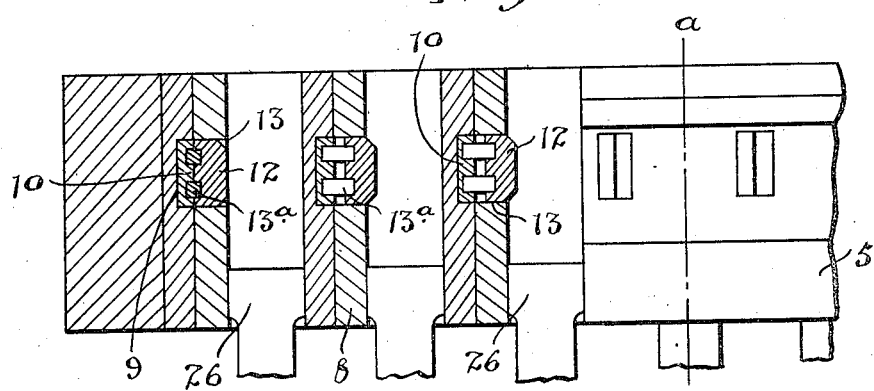
Fig. 10 is a longitudinal vertical part sectional view of the molds through the line $a$—$b$ of Fig. 9.
Figure 11:
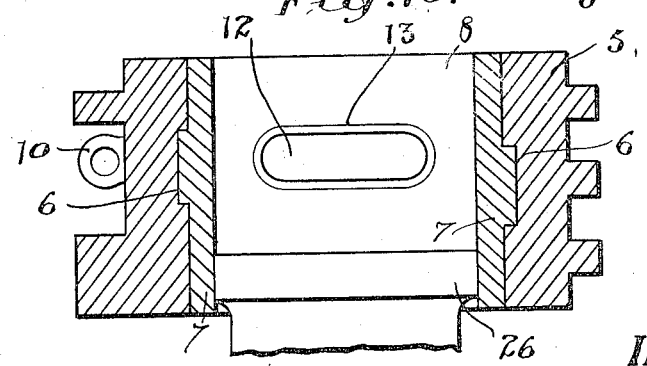
Fig. 11 is a vertical cross sectional view through the line $a$—$b$ of Fig. 10.

Referring to the drawings, the main frame of the machine is formed of a pair of side frames or standards 1 secured to a base 2 and joined rigidly at the top by a bridge piece 3.

4 is the mold table arranged transversely of the machine about midway of its height and at the forward side. This table consists of a frame 5 having longitudinal grooves 6 in their inner faces in which lining plates 7 of hard metal are secured.

8 are transverse division walls dividing the mold into several compartments. The division walls 8 are formed with longitudinal grooves 9 intermediate of their height in which are slidably arranged the bars 10 which project rearwardly through openings 11 in the rear wall of the mold.

12 are blocks arranged in recesses 13 in the walls of the mold and communicating with the grooves 9. These blocks form the dies for forming frogs or other impressions in the sides of the bricks.

13$^a$ are short links arranged in pairs secured in beveled recesses 14 in the blocks 12 and in corresponding reversely arranged recesses in the bars 10, said links being adapted to move the blocks 12 inwardly or outwardly on the operation of the bars 10.

The mold frame is supported at the ends upon adjustably arranged inclined blocks 15 carried on the inner sides of the standards 1.

16 is the bed bearing for the main power toggle secured to the base in perpendicular alinement with the center of the molds having a concaved bearing portion 17 at the top and formed with a pair of rearwardly projecting brackets 18 having journal bearings 19 at the inner ends.

20 is the lower toggle member having a lower shaft portion 21 journaled in the bearing 17, said shaft 21 having its axis arranged in horizontal alinement with the axis of the bearings 19 on the brackets 18.

22 is the upper toggle member having its central portion 23 journaled in the jaw shaped upper portion of the member 20. The outer ends 24 of the upper member extend into vertical guide ways 25 arranged on the inner sides of the standards 1 below the mold table.

26 are the dies secured to or forming part with a transverse member 27 which is formed with a concave bearing 28 on the underside resting upon the upper toggle member 22, the dies entering the molds in the mold frame and adapted to slide vertically.

29 is the main toggle connecting rod formed with a loop shaped head 30 through the slot of which the pin 31 of the upper toggle extends, a roller 32 being carried on said pin.

33 are links carried on a shaft 34 journaled in the bearings 19 in the brackets 18 and pivotally connected to the connecting rod 29 being arranged parallel with the lower toggle member 20 and supporting the connecting rod in a horizontal position.

35 is the main operating shaft journaled in suitable bearing in the standards 1.

36 are a pair of face cams secured on the shaft 35 and engaging roller pins 37 on the rear end of the connecting rod 29 having the cam grooves 38 adapted to draw the connecting rod 29 rearwardly to straighten the toggle and move the presser dies upwardly in the molds and to return same to their original lowered position.

The ends of the shaft 21 of the lower toggle extend into the vertical guide ways 25 and between the central portion of the lower toggle and said guides are arranged a pair of journal blocks 39.

40 are bed blocks arranged below the blocks 39 and spaced therefrom.

41 are blocks slidably arranged between the blocks 39 and 40.

42 are links arranged in inclined recesses in the blocks 40, 41 and 42 and pivotally connected at the ends, the upper pairs of links being arranged parallel and extending upwardly and outwardly in an inclined arrangement and the lower parallel links being inclined downwardly and outwardly at an angle corresponding to the upper links so that when the blocks 41 are operated the upper blocks will be raised or lowered by said links.

43 are a pair of levers pivotally supported on the studs 44 arranged on the inner sides of the standards 1, said levers having slotted lower ends through which the pins 45 in the jaw shaped ends 46 of the sliding block 41 extend.

47 are roller pins secured to the levers 43 intermediate of their length adapted to engage the cam grooves 48 in the cams 49 secured to the shaft 35, said cams being adapted to swing said levers on their pivots to operate the blocks 41 at the proper period and to return them to normal.

50 is a shaft journaled in bearings 51 in the standards 1 and carrying a pair of levers 52, said levers at their lower ends having roller pins engaging cam grooves in the cams 53 secured to the main shaft 35.

54 is a rod connecting the rearward ends of the bars 10 for operating the frog dies.

55 are links pivotally secured to the rods 54 and to the upper ends of the levers 52 thereby completing the operating connection between the cams 53 and the frog forming mechanism.

56 is a table extending transversely between the standards 1 immediately to the rear of the mold frame, the top thereof being level with the top of said frame.

57 is the main feed table slidably arranged upon the table 56 having an open receptacle portion 58.

59 is a feed chute connected with a suitable material supply and arranged to discharge into the receptacle 58.

60 are lugs arranged below the feed table 57 at the rear end.

61 is a shaft journaled in the standards 1 close to the base and toward the rear of the machine.

62 are levers keyed to the shaft 61 and extending upwardly inside the standards having slotted upper ends 63 adapted to receive laterally projecting pins from the lugs 60 on the table 57.

64 are levers keyed to the outer ends of the shaft 61 outside the frame and extending upwardly and provided with roller pins at the upper ends adapted to engage the cam groove of the face cams 65 secured to the shaft 35 outside the frame. This cam operates the double set of levers to slide the feed table 57 forward and backward to carry a supply of the brick material to the molds.

The main shaft is operated through the spur gears 66 secured to the outer ends and meshing with the gears 67 carried on a shaft 68 journaled in the standards 1 perpendicularly above the shaft 35.

The shaft 68 is operated through a train of gears 69, 70 and 71 operated from the shaft 72 upon which a drive pulley 73 is mounted.

74 is the upper force block having the ends slidably held in vertical guides 75 arranged on the inner sides of the standards above the mold and in central alinement therewith.

76 is a shaft journaled in bearings 77 at the top of the standards in perpendicular alinement with the center of the die block and driven by a spur gear 78 meshing with a spur gear 79 secured to the shaft 68.

80 and 81 are cam disks arranged in pairs upon the shaft 76 each side of the gear 78.

82 are connecting rods secured to the force blocks 74 and formed with longitudinal slots 83 through which the shaft 76 extends. The upper ends of the rods 82 are provided with roller pins projecting at each side to extend into the cam grooves in the cams 80 and 81. These cams are adapted to reciprocate the presser block intermittently in unison with the lower dies in a manner as will hereinafter appear.

83ª are face plates secured to the underside of the presser block 74 and adapted to enter the top of the molds and to exert a downward pressure against the material in the molds.

84 is a wire brush secured to the forward edge of the main feed table 57 and adapted to engage and clean the face plates 83ª as the feed table moves forwardly.

85 are brackets rigidly secured to the outer sides of the standards 1 having dove tail grooves 86 in the top, the bottom of said grooves being arranged in horizontal alinement with the top of the mold frame.

87 are plates slidably arranged in the bottom of the grooves 86 and extending through transverse slots in the standards.

88 are plates arranged above the plates 87 and slidable thereon and having openings therethrough corresponding in shape to the horizontal shape of the molds and adapted to register with said molds when moved to their inward position.

89 are yokes connected to the outer ends of the plates 88 and extending below the brackets 85, each having a stud 90 extending downwardly from the center.

The under plates are held to move inwardly over the mold with the plates 88 by spring latch members 91, the upper ends of which project laterally and are adapted to engage cam projections extending upwardly from the edges of the brackets to release the under plates.

92 are cords secured to the outer ends of the under plates 87 and extending over rollers 93 having weights at the outer ends adapted to withdraw the under plates on the release of the latches.

94 are levers pivotally supported intermediate of their length upon brackets 95 extending outwardly from the standards to the rear of the brackets 85. The forward ends of the levers 94 are slotted to receive the studs 90 connected to the plates 88.

96 are cam drums secured to the outer ends of the shaft 68 having the grooves 97 engaging the pins 98 on the rear ends of the levers 94.

99 are feed chutes arranged above the plates 88 and adapted to discharge a supply of the brick facing material into the openings in the plates 88.

In the operation of this machine, a supply of the desired materials is placed in the feed chutes and the pocket 58 in the table 57 is filled. The cams 65 operate the levers 64 and 62 to move the table forwardly to bring the pocket 58 into register with the molds and the material drops therein and the feed table is immediately withdrawn.

When the material has been deposited in the mold the frog cams 53 operate the levers 52 to push the bars 10 forwardly. The forward movement of the bars 10 swings the links 13 and forces the frog dies or blocks 12 inwardly into the mold.

The drum cams 96 then operate the levers 94 to slide the plates 87 and 88 inwardly and as they pass beneath the chutes the openings in the plates 88 are filled, the plate 87 forming a bottom therefor. When these plates reach their inward positions the openings containing a thin layer of facing material are brought into register above the molds and the latches 91 are raised to release the plates 87. The weights on the cords 93 then withdraw the under plates allowing the material to drop into the molds and the plates 88 are then withdrawn through the operation of the levers 94.

The cams 80 and 81 then operate to move the force block 74 downwardly and simultaneously the cams 36 draw upon the connecting rod 29 thereby straightening the main presser toggle and forcing the bottom dies upwardly. The material in the mold is thus pressed downwardly from the top and upwardly from the bottom simultaneously. The facing material and body material are thereby pressed together and thoroughly united and as the frog forming die is moved into position before the pressure is applied the form of the frog is properly impressed.

The cams 80 and 81 then withdraw the upper dies and the cams 53 simultaneously withdraw the frog dies so that the bricks are cleared and free for removal. The cams 49 then swing the levers 43 forwardly on their pivots pushing the blocks 41 forwardly and consequently lifting the toggle and the bottom dies carried thereby until the tops of the dies are level with the top of the mold and the finished bricks are raised clear of the mold. The slotted head of the connecting rod 29 allows the pin 31 of the toggle to move upwardly without disturbing the rod and the feed table 57 again moves forwardly pushing the completed bricks off the mold on to a suitable receiving table or platform which is not shown. The dies are then immediately returned to their lower position by the double operation of the rearward operation of the slide block 41 lowering the toggle and by the connecting rod breaking the toggle joint.

The forward movement of the feed table moves the brush 84 across the face of the upper dies removing any material which may have adhered thereto.

It will be noted that the connecting rods 82 operating the upper presser block always operates with a perpendicular movement and the cam grooves are so formed that when said rods reach the downward limit of their movement the roller pins are engaging practically transverse surface and being always central the thrust is directly in line with the shaft and the cam disks are supported by blocks 100 carried by the bridge 3. The lines of force of the upper and lower presser members are thus in the same perpendicular plane and a very heavy pressure may be exerted.

A machine such as described has a very great capacity as a number of bricks are formed at one operation of the mechanism. The material is placed in a uniform quantity in each mold and all are subjected to uniform pressure. Bricks having special facings are made as rapidly as other forms and the facing material being placed in the mold prior to the application of the pressure is thoroughly united to the body material.

The size or shape of the bricks can be varied as desired by changing the mold linings and dies or a large block the full size of the mold may be produced if desired and in all cases the finished article is automatically discharged immediately following its completion.

The parts are all of very simple and strong construction and will not readily get out of order.

What we claim as our invention is:

1. In a brick press, a frame, a mold supported intermediate of the height of said frame, a movable die adapted to close the top of said mold, a movable die closing the bottom of said mold, a toggle member supporting said bottom die and supported on a rigid bearing, means for operating said toggle member, and means for lifting said toggle member clear of its bearing support to raise the bottom die to discharge the bricks.

2. In a brick press, a frame, a mold supported intermediate of the height of said frame, a movable die adapted to close the top of said mold, a movable die closing the bottom of said mold, a toggle member supporting said bottom die, a journal support for the lower end of said toggle, means for operating said toggle, lifting toggle members connected to the lower member of the main toggle, and means for operating the latter toggles to lift the main toggle and die and raise the bricks from the molds.

3. In a brick press, a frame, a mold supported intermediate of the height of said frame, a movable die adapted to close the top of said mold, a movable die closing the bottom of said mold, a toggle member supporting said bottom die, a journal support for the lower end of said toggle, means for operating said toggle, a pair of journal blocks connected to the lower pivot of the toggle, bed blocks spaced below said journal blocks, sliding blocks arranged between the journal and bed blocks, pair of parallel links connecting the journal and bed blocks with the sliding blocks, and means for operating the sliding blocks.

4. In a brick press, a frame, a mold supported intermediate of the height of said frame, a movable die adapted to close the top of said mold, a movable die closing the bottom of said mold, a toggle member supporting said bottom die, a journal support for the lower end of said toggle, means for operating said toggle, lifting toggle members connected to the lower member of the main toggle, levers pivoted to the frame and operatively connected with said lifting toggles, and cams adapted to operate said levers.

5. In a brick press, a frame, a mold supported intermediate of the height of said frame, a movable die adapted to close the top of said mold, a movable die closing the bottom of said mold, a toggle member supporting said bottom die, a connecting rod having a head in the form of a closed loop connected to the center joint of the toggle, means for supporting said connecting rod intermediate of its length, means for supporting said toggle, a cam adapted to operate said connecting rod to straighten said toggle, and means for raising said toggle and bottom die to discharge the bricks.

6. In a brick press, a frame, a mold supported intermediate of the height of said frame, a movable die adapted to close the top of said mold, a movable die closing the bottom of said mold, a journal socket rigidly secured to the base of the frame below the mold, a toggle member having its lower member pivotally supported in said rigid socket and its upper member journaled in the under side of the lower die, perpendicular guides on the frame engaging the extremities of the journal ends of the toggle, a connecting rod connected to the center joint of said toggle, a cam operating said connecting rod, and means for lifting said toggle in the vertical guides clear of the rigid socket to raise the dies and discharge the bricks from the mold.

7. In a brick press, a frame, a mold supported intermediate of the height of said frame, a movable die adapted to close the top of said mold, a movable die closing the bottom of said mold, means for operating said dies, a body material supply, a reciprocating table arranged below said supply having an open pocket to receive and deliver the body material to the mold, a surfacing material supply, a table having a pocket to carry said surfacing material to the mold following the withdrawal of the aforesaid table, and means for operating said tables.

8. In a brick press, a frame, a mold supported intermediate of the height of said frame, a movable die adapted to close the top of said mold, a movable die closing the bottom of said mold, means for operating said dies, a body material supply, a reciprocating table arranged below said supply having an open pocket to receive and deliver the body material to the mold, a table supported from said frame, a plate slidably arranged on said table adapted to be moved over the mold following the withdrawal of the main feed, a perforated plate slidably arranged on the aforesaid plate and forming a pocket to carry a facing material to the mold, means for moving said plates inwardly over the mold and withdrawing same, and means for withdrawing the under plate prior to the withdrawal of the upper plate to allow the deposit of the facing material into the mold.

9. In a brick press, a frame, a mold supported intermediate of the height of said frame, a movable die adapted to close the top of said mold, a movable die closing the bottom of said mold, means for operating said dies, a body material supply, a reciprocating table arranged below said supply having an open pocket to receive and deliver the body material to the mold, a table supported from said frame, a plate slidably arranged on said table adapted to be moved over the mold following the withdrawal of the main feed, a perforated plate slidably arranged on the aforesaid plate and forming a pocket to carry a facing material to the mold, a lever pivotally supported from the frame and operatively connected with the perforated plate, a cam operating said lever, a latch member holding the lower plate in operative engagement with the upper plate in its inward movement, means for releasing said latches, and means for withdrawing the under plate on the release of the latches.

10. In a brick press, a frame comprising a pair of rigid standards, a mold frame supported between said standards, lining plates arranged in said mold and dividing it into a plurality of molds, said lining plates having recesses therein opening through the back of the mold, bars slidably arranged in said recesses, means for reciprocating said bars, die blocks arranged in said recesses adapted to be projected into the molds, parallel links pivotally secured at one end to said bars and at the other end to said die blocks and adapted to move said die blocks inwardly and outwardly on the operation of said bars, means for filling the molds, and means for compressing the material in said molds and discharging the pressed articles therefrom.

11. In a brick press, in combination, a base, a pair of standards, a mold supported intermediate of the height of said standards, a die closing the bottom of said mold, a toggle member supporting said die, a shaft journaled in said standards arranged to the rear of said toggle, cam disks carried on said shaft, a connecting rod operatively connected with the joint of said toggle and engaging said cams, lifting toggles connected with the aforesaid toggle, levers pivotally secured to the standards and operatively connected to said lifting toggles, cams carried on said shaft adapted to operate said levers to lift the die in discharging the completed articles, a top die adapted to close the top of the mold, means for moving the top dies downwardly immediately preceding the upward movement of the bottom dies and withdrawing same immediately following the straightening of the toggle, and means for feeding the material to the mold at the proper period.

12. In a brick press, in combination, a base, a pair of standards, a mold supported intermediate of the height of said standards, a die closing the bottom of said mold, a toggle member supporting said die, a feed table adapted to be moved over the mold to discharge a supply of material thereinto, a feed table adapted to be moved over said mold following the withdrawal of the aforesaid table and adapted to discharge a supply of facing material to the mold, an upper die adapted to be moved down to close the top of the mold immediately following the removal of the second feed table, means for straightening said toggle to compress the material in the mold, means for lifting the upper die following the compression of the material, means for lifting the lower die in synchrony with the raising of the upper die to bring the upper face thereof level with the top of the mold and retaining same for a period to allow the finished articles to be removed by the forward movement of the initial feed table.

J. T. JACKSON,
S. JACKSON.

Copies of this patent may be obtained for five cents each, by addressing the "Commissioner of Patents, Washington, D. C."